(12) United States Patent
Franz et al.

(10) Patent No.: US 8,443,942 B2
(45) Date of Patent: May 21, 2013

(54) SEAL ARRANGEMENT

(75) Inventors: Ralf Franz, Bad Urach (DE); Marco Schrade, Hayingen (DE)

(73) Assignee: ElringKlinger AG, Dettingen (DE)

( * ) Notice: Subject to any disclaimer, the term of this patent is extended or adjusted under 35 U.S.C. 154(b) by 1182 days.

(21) Appl. No.: 12/002,959

(22) Filed: Dec. 19, 2007

(65) Prior Publication Data

US 2008/0203675 A1 Aug. 28, 2008

(30) Foreign Application Priority Data

Feb. 27, 2007 (DE) .................... 10 2007 009 488

(51) Int. Cl.
*F01M 11/04* (2006.01)
*F16N 21/00* (2006.01)
*F16N 31/00* (2006.01)

(52) U.S. Cl.
USPC .................. 184/105.3; 184/1.5; 184/106

(58) Field of Classification Search
USPC ...... 184/1.5, 105.3, 106; 123/196 R; 277/592
See application file for complete search history.

(56) References Cited

U.S. PATENT DOCUMENTS

| | | | |
|---|---|---|---|
| 3,387,621 A | 6/1968 | Schaff | 137/322 |
| 4,124,220 A * | 11/1978 | Leone et al. | 277/502 |
| 4,951,783 A | 8/1990 | Kamprath et al. | 184/1.5 |
| 5,327,862 A * | 7/1994 | Bedi | 123/196 R |
| 5,808,187 A | 9/1998 | Gooden et al. | 73/118.1 |
| 6,052,896 A | 4/2000 | Howell, III et al. | 29/888.011 |
| 6,234,274 B1 * | 5/2001 | van der Griendt | 184/105.3 |
| 7,308,970 B2 * | 12/2007 | Holub | 184/106 |
| 7,357,225 B2 * | 4/2008 | Dorian | 184/1.5 |
| 2006/0054402 A1 | 3/2006 | Dorian | 184/1.5 |
| 2008/0135335 A1 * | 6/2008 | Lowman | 184/1.5 |

FOREIGN PATENT DOCUMENTS

| | | |
|---|---|---|
| DE | 71 01 791 U | 1/1971 |
| DE | 20 54 836 A | 6/1972 |
| DE | 24 34 486 A1 | 2/1975 |
| DE | 29 22 851 A1 | 12/1980 |
| DE | 34 31 516 A1 | 3/1986 |
| DE | 38 31308 C1 | 1/1990 |
| DE | 43 22 727 A1 | 1/1995 |
| DE | 101 05 625 A1 | 8/2002 |
| DE | 102 37 668 A1 | 3/2003 |
| DE | 20 2006 013 62 | 12/2006 |
| DE | 601 24 084 T2 | 1/2007 |
| DE | 10 2006 009 209 A1 | 3/2007 |
| EP | 0 358 896 A2 | 3/1990 |
| EP | 1 333 160 A1 | 8/2003 |
| WO | WO 01/83954 A1 | 11/2001 |

* cited by examiner

*Primary Examiner* — William E Dondero
*Assistant Examiner* — Robert T Reese

(57) ABSTRACT

In order to provide a seal arrangement for sealing a through-opening in a wall of an engine component, comprising an insert element for insertion into the through-opening, wherein the insert element has a through-channel that is closable by means of a closure element, and a sealing element for sealing between the insert element and the engine component, which seal arrangement has an adequate sealing action, even with low manufacturing outlay it is proposed that the sealing element in the assembled state of the seal arrangement is disposed in axial direction of the insert element between the insert element and the engine component.

25 Claims, 3 Drawing Sheets

SEAL ARRANGEMENT

Figure 1:
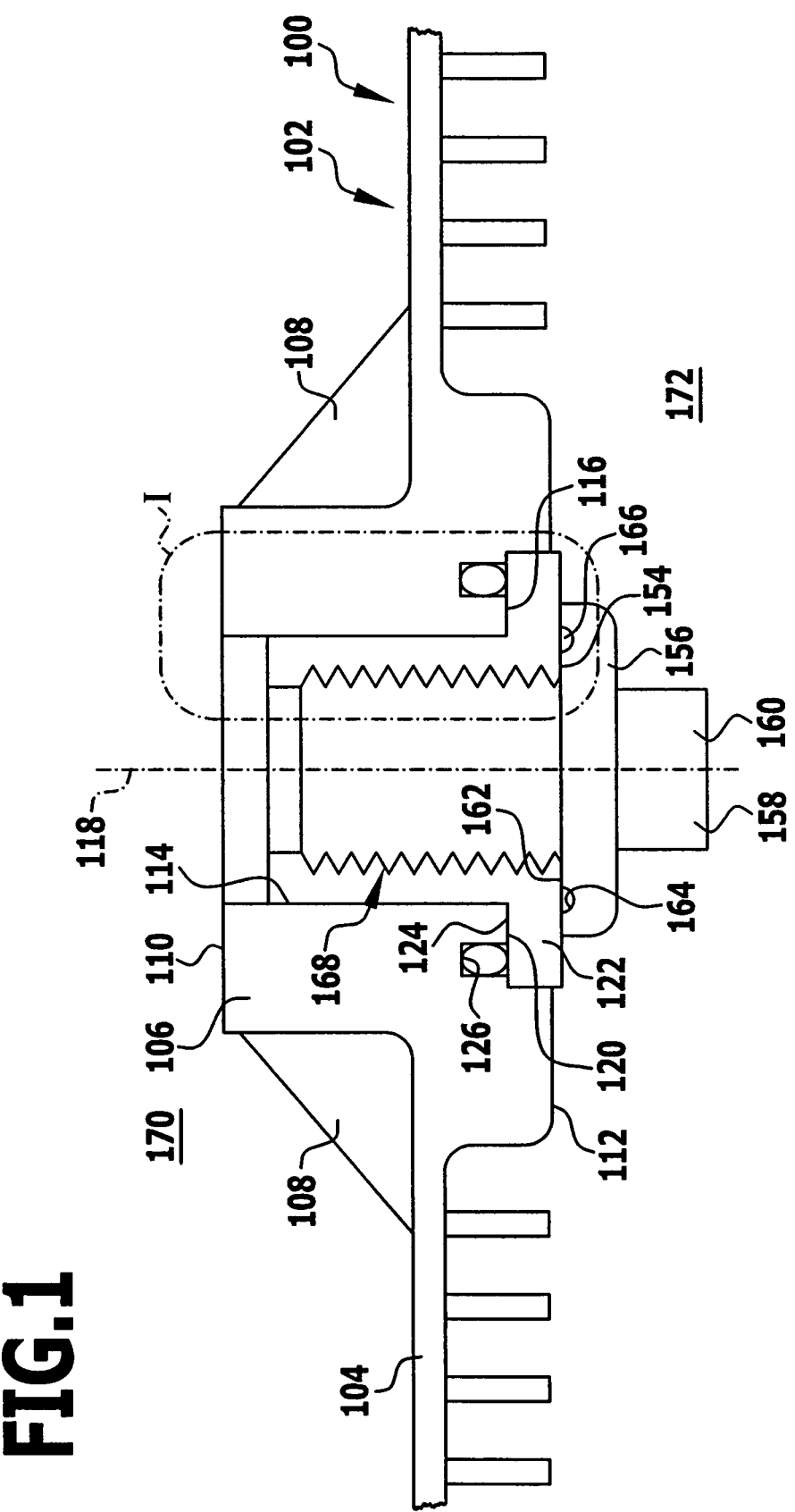

The present disclosure relates to the subject matter that was disclosed in the German patent application No. 10 2007 009 488.6 of 27 Feb. 2007. The entire description of this earlier application is incorporated by reference into the present description.

The present invention relates to a seal arrangement for sealing a through-opening in a wall of an engine component, comprising an insert element for insertion into the through-opening, wherein the insert element has a through-channel that is closable by means of a closure element, and a sealing element for sealing between the insert element and the engine component.

Such seal arrangements are known.

In particular, a seal arrangement for sealing a through-opening in a wall of an oil tray is known, which comprises a threaded insert element for insertion into the through-opening, wherein the threaded insert element for the passage of engine oil out of the oil tray has a through-channel that is closable by means of an oil screw plug, and wherein moreover a sealing ring made of an elastomeric material is disposed in an annular groove in a peripheral surface of the substantially hollow-cylindrical threaded insert element in order to seal off a sealing gap between the threaded insert element and a boundary wall of the through-opening in the oil tray in radial direction.

This radial seal arrangement requires a precisely machined through-opening in the oil tray in order to achieve an adequate seal between the threaded insert element, on the one hand, and the oil tray, on the other hand.

The underlying object of the present invention is to provide a seal arrangement of the initially described type that also has an adequate sealing action even with low manufacturing outlay.

In a seal arrangement having the features of the preamble of claim 1, this object is achieved according to the invention in that the sealing element in the assembled state of the seal arrangement is disposed in axial direction of the insert element between the insert element and the engine component.

The underlying concept of the seal arrangement according to the invention is therefore to employ an axially effective sealing element instead of a radially effective sealing element.

Axial sealing offers the advantage that the desired sealing action is achieved even if the through-opening in the engine component has a high dimensional tolerance.

The manufacturing outlay and the costs incurred by manufacture of the seal arrangement are therefore markedly reduced.

At the same time, a sealing action may be achieved that is at least just as good as, or even better than with the known radial sealing.

The term "engine component", as used in the present description and the accompanying claims, includes not only the components that directly form the engine or are directly connected thereto but also any components that are workingly connected to the engine, in particular the components of a gearbox connected to the engine.

The engine is preferably the internal combustion engine of a motor vehicle.

In the seal arrangement according to the invention, the sealing element in the assembled state of the seal arrangement preferably rests against a sealing surface of the insert element that is oriented transversely of the axial direction of the insert element.

The axial direction of the insert element may be in particular an axis of symmetry of the insert element.

It is particularly advantageous if the sealing surface of the insert element is oriented substantially perpendicularly to the axial direction of the insert element.

It is further preferably provided that the sealing element in the assembled state of the seal arrangement rests against a sealing surface of the insert element, the mean surface normal of which sealing surface is aligned substantially parallel to the axial direction of the insert element.

If the sealing surface of the insert element is of a planar design, the surface normals at every point of the sealing surface are oriented in the same direction, with the result that the direction of the mean surface normal coincides with the direction of the local surface normals at every point of the sealing surface.

In a preferred development of the invention it is provided that the insert element comprises a basic body and a collar projecting in radial direction from the basic body.

The basic body may in particular be of a substantially hollow-cylindrical design.

It has proved particularly advantageous if the sealing element in the assembled state of the seal arrangement rests against the collar.

It may further be provided that the sealing element in the assembled state of the seal arrangement is disposed at least partially at a recess, in particular a groove, provided on the engine component.

The sealing element may in particular be of a closed-ring-shape configuration.

It may further be provided that the sealing element takes the form of a profile sealing element, i.e. has a substantially constant profile along a longitudinal direction of the sealing element.

This profile may be in particular an O-shaped profile, an H-shaped profile or a box- or block profile. In a preferred development of the invention, the sealing element is an element formed separately from the insert element.

Alternatively or in addition to this, it may also be provided that the sealing element is moulded onto the engine component.

It would moreover also be conceivable to mould the sealing element onto the insert element.

So that the sealing element in the assembled state of the seal arrangement may be allowed to rest under elastic bias against the sealing surfaces of the insert element and the engine component, the sealing element is preferably of an elastically deformable design.

In particular, it may be provided that the sealing element comprises an elastomeric material, preferably being formed entirely from an elastomeric material.

Thus, the sealing element may comprise for example a fluororubber (FPM), an ethylene-acrylate rubber (AEM), a polyacrylate rubber (ACM) and/or a silicone rubber (MVQ).

The insert element may comprise a metal material, preferably being formed entirely from a metal material.

It has proved particularly advantageous if the insert element comprises brass.

In a preferred development of the invention it is provided that the through-channel of the insert element is provided with a thread. This makes it easy to connect the insert element to a closure element that is provided with a complementary thread.

In a preferred development of the invention it is provided that the seal arrangement comprises a closure element for closing the through-channel of the insert element.

Such a closure element may in particular be provided with a thread. This makes it easy to connect the closure element to an insert element having a thread that is complementary thereto.

The closure element may in particular take the form of a screw plug.

In order to achieve adequate sealing between the closure element and the insert element, it may be provided that the closure element is provided with a sealing element for sealing between the closure element and the insert element.

The closure element may comprise a metal material, preferably being formed entirely from a metal material.

In particular it may be provided that the closure element comprises a steel material.

It may further be provided that the seal arrangement comprises an engine component.

The engine component may comprise a plastics material, preferably being formed entirely from a plastics material.

In particular it may be provided that the engine component comprises polyamide (PA).

The engine component may in particular take the form of an engine oil tray, a gear oil tray or a cylinder head cover.

The engine component may take the form of a receiving container for a liquid, for example engine oil or gear oil.

The through-opening in the engine component may be used to remove liquid from the engine component and/or to supply liquid to the engine component.

A particularly durable connection between the insert element and the engine component is achieved if the insert element is connected to the engine component by thermal embedding.

The sealing element, which in the assembled state of the seal arrangement in an axial sealing arrangement rests against the insert element, may be inserted into a recess of the engine component before the insert element is introduced into the through-opening of the engine component and connected to the engine component.

Thus, unlike in the case of the conventional radial seal arrangement, the sealing element does not have to be introduced together with the insert element into the through-opening of the engine component, thereby ruling out damage or deformation of the sealing element as a result of rubbing against the boundary wall of the through-opening of the engine component.

Further features and advantages of the invention are the subject matter of the following description and the graphical representation of an embodiment.

Figure 2:
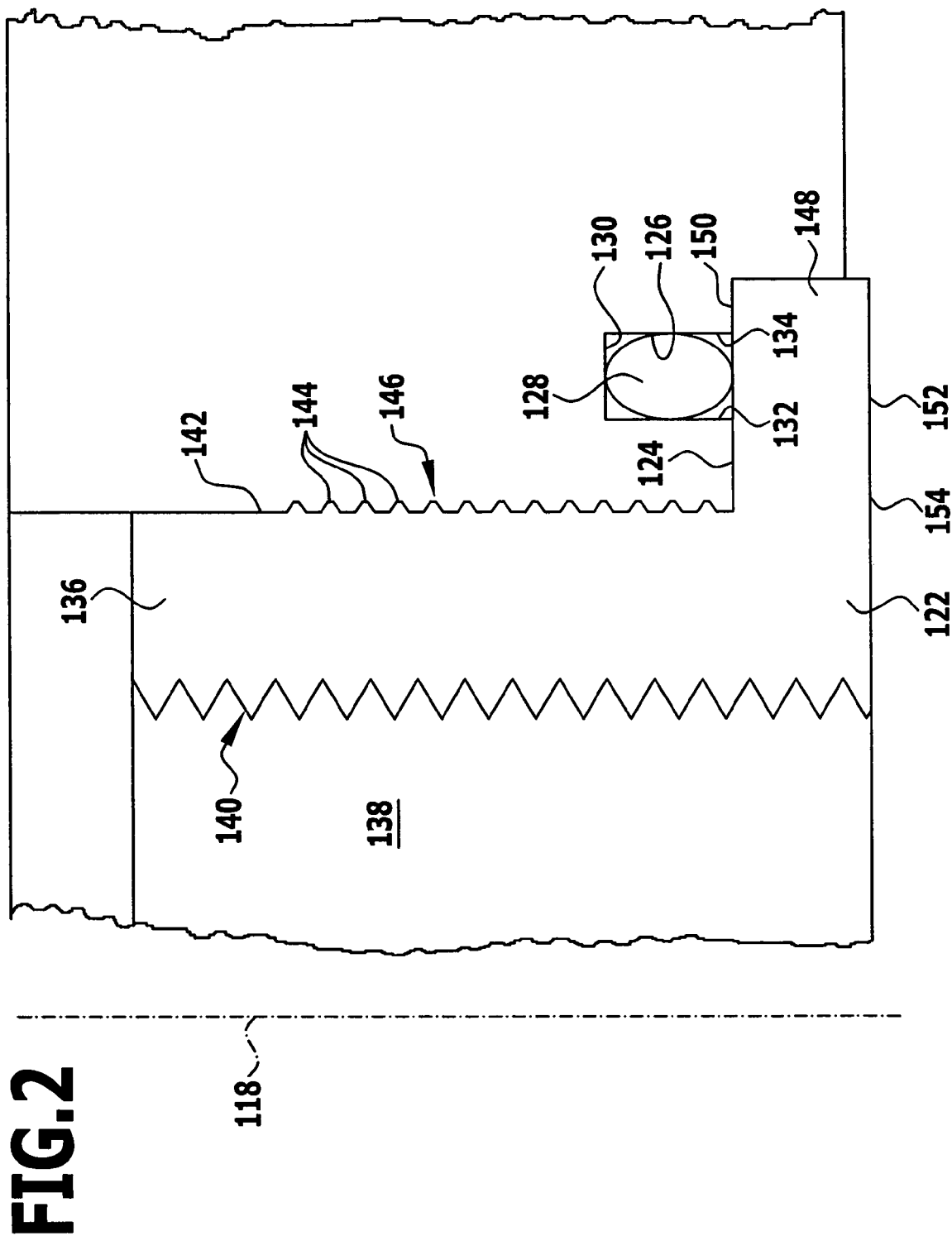
Figure 3:
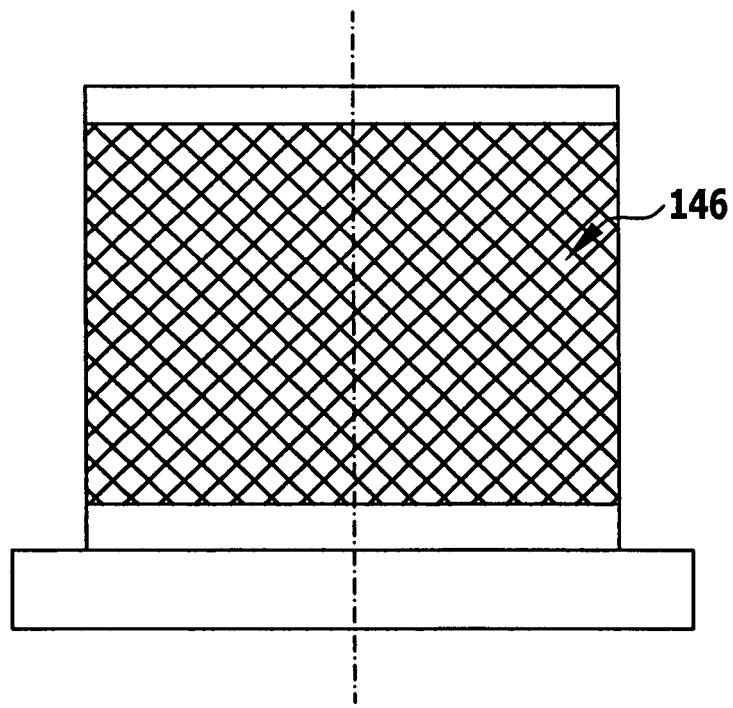

The drawings show:

FIG. 1 a diagrammatic longitudinal section through a bottom region of an oil tray having a drain channel closed by means of a screw plug, wherein the screw plug is screwed into a threaded insert element inserted into the drain channel;

FIG. 2 an enlarged view of the region I of FIG. 1, but without the screw plug; and FIG. 3 a diagrammatic side view of the threaded insert element of FIGS. 1 and 2.

In all of the figures, identical or functionally equivalent elements are denoted by the same reference characters.

An engine component 100 in the form of an oil tray 102, which is represented sectionally in FIG. 1, comprises a bottom wall 104 having a substantially cylindrical, thickened drain region 106, which is supported by triangular supports 108.

The drain region 106 is penetrated from its upper side 110 to its underside 112 by a cylindrical through-opening 114, the radius of which widens at a shoulder 116 in the bottom region of the through-opening 114.

The shoulder 116 has a seating surface 120, which is oriented substantially at right angles to an axial direction 118 of the through-opening 114 and flat against which an insert element 122 rests with a sealing surface 124.

In the region of the seating surface 120 the engine component 100 is provided with an annular groove 126 that has a substantially rectangular cross section.

As may best be seen from the enlarged view of FIG. 2, in the annular groove 126 a likewise annular sealing element 128 is accommodated, which in turn rests sealingly under elastic bias against the sealing surface 124 of the insert element 122, on the one hand, and against a groove bottom surface 130 of the annular groove 126, on the other hand.

The sealing element 128 may further rest sealingly against one of the two mutually opposite groove side surfaces 132, 134 or against both of these groove side surfaces 132, 134, in each case under elastic bias.

Instead of an O-shaped profile, the sealing element 128 may have any other desired profile, in particular an H-shaped profile, an X-shaped profile, a Y-shaped profile or a box- or block profile.

In the case of a box or block profile, the annular sealing element 128 may substantially completely fill the annular groove 126 and rest sealingly flat against the groove bottom surface 130, against the two groove side surfaces 132, 134 and against the sealing surface 124 of the insert element 122.

The insert element 122 comprises a substantially hollow-cylindrical basic body 136, which surrounds a through-channel 138 extending in the common axial direction 118 of the insert element 122 and the through-opening 114 of the drain region 106 and is provided with an internal thread 140.

The basic body 136 of the insert element 122 is provided at its outer side 142 with uneven portions 144 in the form of a knurl 146 in order to achieve an improved meshing with, and a better purchase on, the boundary wall of the through-opening 114 of the drain region 106.

On its bottom end the insert element 122 has a collar 148, which projects in radial direction from the basic body 136 and of which the top end face 150 extending substantially at right angles to the axial direction 118 of the insert element 122 forms the sealing surface 125, with which the insert element 122 is applied against the sealing element 128.

The bottom end face 152 of the collar 148, which is likewise oriented substantially perpendicularly to the axial direction 118 of the insert element 122, forms a sealing surface 154, flat against which a screw head 156 of a screw plug 160 serving as closure element 158 rests with a supporting surface 162.

In the region of the supporting surface 162 the screw head 156 is provided with an annular groove 164, into which an annular sealing element 166 made of an elastomeric material is inserted.

Once the screw plug 160 has been screwed by its external thread 168 fully into the internal thread 140 of the insert element 122, the sealing element 166 rests sealingly under elastic bias against the screw head 156, on the one hand, and against the sealing surface 154 on the collar 148 of the insert element 122, on the other hand.

By unscrewing the screw plug 160 out of the internal thread 140 of the insert element 122, the through-channel 138 of the insert channel 122 may be opened in order to drain off a liquid medium, in particular oil, from an interior 170 of the engine component 100 into the exterior 172 thereof.

The closure element 158 is preferably formed from a metal material, in particular from a steel material.

The insert element 122 is likewise preferably formed from a metal material, preferably from brass.

The annular sealing element 128 is preferably formed from an elastomeric material, for example from a fluororubber (FPM), an ethylene-acrylate rubber (AEM), a polyacrylate rubber (ACM) or a silicone rubber (MVQ).

The engine component 100, in particular the oil tray 102, is preferably formed from a plastics material, for example from a polyamide.

The engine component 100 is preferably an injection-moulded part that is formed from a suitable plastics material by means of an injection moulding operation.

The insert element 122 is connected to this injection-moulded part by means of a thermal embedding operation.

For this purpose, the insert element 122 is heated to a temperature of for example approximately 350° C. and press-fitted under increased pressure into the through-opening 114 of the engine component 100, the original inside diameter of which through-opening is slightly smaller than the outside diameter of the basic body 136 of the insert element 122.

As a result of this thermal embedding, the outer side of the insert element 122 is welded to the boundary wall of the through-opening 114 of the engine component 100.

This welding is however not oil-proof in the long term; an escape of oil through the gap between the engine component 100 and the insert element 122 is however effectively prevented in the long term by the axial sealing by means of the annular sealing element 128 in the groove 126.

The sealing element 128 extends from the sealing surface 124 on the collar 148 of the insert element 122 in the axial direction 118 of the insert element 122 to the groove bottom surface 130, which lies opposite the sealing surface 124 and forms a further sealing surface on the engine component side.

The mean surface normal of the sealing surface 124 is oriented parallel to the axial direction 118 of the insert element 122.

The fact that the seal between the engine component 100 and the insert element 122 by means of the sealing element 128 is configured as an axial seal means that—unlike in the case of a radial seal—the effectiveness of the sealing function is not dependent upon the through-opening 114 in the engine component 100 being a bore that is machined with the utmost precision.

Tolerances in the construction of the seating surface 120, in which the groove 126 is formed, and in the construction of the groove 126 itself may easily be compensated by means of the elastically deformable sealing element 128.

Furthermore, the sealing element 128 in an axial seal arrangement may easily be inserted into the groove 126 before the insert element 122 is introduced into the through-opening 114 of the engine component 100 and connected to the engine component 100.

As an alternative to this, it is also possible to mould the sealing element 128 directly onto the engine component 100, in particular the oil tray 102.

Thus, unlike in the case of the conventional radial seal arrangement, the sealing element 128 does not have to be introduced together with the insert element 122 into the through-opening 114 of the engine component 100, thereby ruling out damage or deformation of the sealing element 128 because of rubbing against the boundary wall of the through-opening 114.

The invention claimed is:

1. Seal arrangement for sealing a through-opening in a wall of an engine component, comprising the engine component, an insert element for insertion into the through-opening, wherein the insert element has a through-channel that is closable by means of a closure element, and a sealing element for sealing between the insert element and the engine component, wherein the sealing element in the assembled state of the seal arrangement is disposed in axial direction of the insert element between the insert element and the engine component, wherein the seal element in the assembled state of the seal arrangement is at least partially disposed in an annular groove, wherein the groove is provided in a seating surface of the engine component, which seating surface is oriented substantially at right angles to the axial direction of the insert element, the insert element resting with a sealing surface flat against the seating surface, wherein the groove has a groove bottom surface which lies opposite the sealing surface in the axial direction of the insert element, wherein the groove is located in a distance from the through-opening, and wherein the insert element is connected to the engine component by thermal embedding.

2. Seal arrangement according to claim 1, wherein the sealing element in the assembled state of the seal arrangement rests against a sealing surface of the insert element that is oriented transversely of the axial direction of the insert element.

3. Seal arrangement according to claim 2, wherein the sealing surface of the insert element is oriented substantially perpendicular to the axial direction of the insert element.

4. Seal arrangement according to claim 1, wherein the sealing element in the assembled state of the seal arrangement rests against a sealing surface of the insert element, the mean surface normal of which sealing surface is aligned substantially parallel to the axial direction of the insert element.

5. Seal arrangement according to claim 1, wherein the insert element comprises a basic body and a collar projecting in radial direction from the basic body.

6. Seal arrangement according to claim 5, wherein the sealing element in the assembled state of the seal arrangement rests against the collar.

7. Seal arrangement according to claim 1, wherein the sealing element is of an annular configuration.

8. Seal arrangement according to claim 1, wherein the sealing element has a substantially constant profile along a longitudinal direction of the sealing element.

9. Seal arrangement according to claim 1, wherein the sealing element has an O-shaped profile, an H-shaped profile or a box profile.

10. Seal arrangement according to claim 1, wherein the sealing element is an element formed separately from the insert element.

11. Seal arrangement according to claim 1, wherein the sealing element comprises an elastomeric material.

12. Seal arrangement according to claim 11, wherein the sealing element comprises a fluororubber (FPM), an ethylene-acrylate rubber (AEM), a polyacrylate rubber (ACM) and/or a silicone rubber (MVQ).

13. Seal arrangement according to claim 1, wherein the insert element comprises a metal material.

14. Seal arrangement according to claim 13, wherein the insert element comprises brass.

15. Seal arrangement according to claim 1, wherein the through-channel of the insert element is provided with a thread.

16. Seal arrangement according to claim 1, wherein the seal arrangement comprises a closure element for closing the through-channel of the insert element.

17. Seal arrangement according to claim 16, wherein the closure element is provided with a thread.

18. Seal arrangement according to claim 16, wherein the closure element takes the form of a screw plug.

19. Seal arrangement according to claim 16, wherein the closure element is provided with a sealing element for sealing between the closure element and the insert element.

20. Seal arrangement according to claim 16, wherein the closure element comprises a metal material.

21. Seal arrangement according to claim 20, wherein the closure element comprises a steel material.

22. Seal arrangement according to claim 1, wherein the engine component comprises a plastics material.

23. Seal arrangement according to claim 22, wherein the engine component comprises polyamide (PA).

24. Seal arrangement according to claim 1, wherein the engine component takes the form of an engine oil tray, a gear oil tray or a cylinder head cover.

25. Seal arrangement according to claim 1, wherein the groove has two mutually opposite groove side surfaces.

* * * * *

UNITED STATES PATENT AND TRADEMARK OFFICE
CERTIFICATE OF CORRECTION

PATENT NO. : 8,443,942 B2
APPLICATION NO. : 12/002959
DATED : May 21, 2013
INVENTOR(S) : Ralf Franz et al.

Page 1 of 1

It is certified that error appears in the above-identified patent and that said Letters Patent is hereby corrected as shown below:

In the Claims:

Column 6, Claim 1, line 7, replace --seal element-- with --sealing element--.

Signed and Sealed this
Sixteenth Day of July, 2013

Teresa Stanek Rea
*Acting Director of the United States Patent and Trademark Office*